(12) United States Patent
Frank et al.

(10) Patent No.: US 10,449,460 B1
(45) Date of Patent: Oct. 22, 2019

(54) DYNAMIC GENERATION OF A DRAFT OF VIRTUAL ENTITIES WITHIN A GAME APPLICATION ENVIRONMENT

(71) Applicant: Electronic Arts Inc., Redwood City, CA (US)

(72) Inventors: Jeffrey Edward Frank, Apopka, FL (US); Thomas Adam Parry, Longwood, FL (US); Jeffry Steven Younger, Orlando, FL (US)

(73) Assignee: ELECTRONIC ARTS INC., Redwood City, CA (US)

(*) Notice: Subject to any disclaimer, the term of this patent is extended or adjusted under 35 U.S.C. 154(b) by 362 days.

(21) Appl. No.: 15/239,640

(22) Filed: Aug. 17, 2016

(51) Int. Cl.

| | |
|---|---|
| *A63F 13/828* | (2014.01) |
| *G06F 3/0482* | (2013.01) |
| *H04L 29/06* | (2006.01) |
| *A63F 13/20* | (2014.01) |
| *A63F 13/352* | (2014.01) |
| *A63F 13/32* | (2014.01) |
| *A63F 13/33* | (2014.01) |
| *A63F 13/332* | (2014.01) |
| *A63F 13/335* | (2014.01) |

(52) U.S. Cl.
CPC ............ *A63F 13/828* (2014.09); *A63F 13/20* (2014.09); *A63F 13/32* (2014.09); *A63F 13/33* (2014.09); *A63F 13/332* (2014.09); *A63F 13/335* (2014.09); *A63F 13/352* (2014.09); *G06F 3/0482* (2013.01); *H04L 67/38* (2013.01); *A63F 2300/406* (2013.01); *A63F 2300/407* (2013.01)

(58) Field of Classification Search
CPC ........ A63F 13/79; A63F 13/80; A63F 13/828; A63F 13/95; A63F 13/20; A63F 13/32; A63F 13/33; A63F 13/335; A63F 13/332; A63F 13/352
See application file for complete search history.

(56) References Cited

U.S. PATENT DOCUMENTS

2008/0265509 A1* 10/2008 Gatzios .................. G07F 17/32
                                                   273/296
2009/0149248 A1*  6/2009 Busey ..................... A63F 13/12
                                                    463/29

\* cited by examiner

*Primary Examiner* — Jasson H Yoo
(74) *Attorney, Agent, or Firm* — Knobbe, Martens, Olson & Bear, LLP

(57) ABSTRACT

The present disclosure provides embodiments of a virtual draft framework that can be used to provide a controlled randomized virtual draft process by using virtual profile groups to selectively control the amount of randomness during the virtual draft process. The virtual draft can include of a predetermined number of rounds. In each round one or more virtual players can be drafted to a virtual team. Each draft round can provide a player with the opportunity to select a virtual characters that will be used within the game application.

20 Claims, 9 Drawing Sheets

DYNAMIC GENERATION OF A DRAFT OF VIRTUAL ENTITIES WITHIN A GAME APPLICATION ENVIRONMENT

BACKGROUND

In video games, users can frequently engage in competitive online games. During some online games users can use static characters or teams. The static characters or teams are usually balanced by the game developers to make the engagements fair. The user generally has no control over the balances or changes to the characters or teams. Some online games provide alternative options for engaging in online matches where users can create their own characters or teams in order to increase engagement of the players. However, user created characters can sometimes create imbalances where some teams are much better than others, which can result in an unenjoyable experience for some players. To help the remedy these problems some games can use randomized teams. However, using randomized teams can still result in drastic imbalances between teams.

SUMMARY OF EMBODIMENTS

The systems, methods, and devices of this disclosure each have several innovative aspects, no single one of which is solely responsible for the all of the desirable attributes disclosed herein.

In one embodiment a system comprising a data store configured to store virtual profile data associated with a plurality of virtual entities and virtual draft framework data; one or more processors configured with computer executable instructions that cause the one or more processors to execute a game application, the game application configured to: generate a user interface within the video game application comprising at least one interface element configured to receive input to initiate a virtual team draft; receive input to initiate a virtual team draft within the game application; generate a virtual team comprising a plurality of virtual entities, the virtual team comprising a plurality of virtual team positions, each virtual entity associated with at least one virtual team position; generate instructions to display a user interface configured to display a virtual team interface identifying the plurality of virtual players within their associated virtual team positions during runtime of the game application; select a predetermined number of virtual packs from one or more virtual predetermined virtual pack groups, based at least in part on a virtual draft framework, the virtual profile pack comprising a plurality of a virtual pack slots, each virtual pack slot associated with a virtual profile group; for each of the selected virtual packs, identify a virtual profile for each virtual pack slot within the virtual pack from the associated virtual profile group, the identification of the virtual profile based, at least in part, on predetermined weighted values associated with the virtual profiles within the associated virtual profile group; generate instructions to display each of the identified virtual profiles, each virtual profile associated with a drafted virtual entity being associated with at least one team position; receive input indicating a selection of one of the identified virtual profiles; and update the user interface to display the drafted virtual entity associated with the selected virtual profile within the virtual team interface.

In another embodiment, method comprising: under the control of a computing system comprising computer hardware, the computing system configured with computer executable instructions to execute a game application, the game application configured to perform operations during runtime of the game application including, generating a user interface within the video game application comprising at least one interface element configured to receive input to initiate a virtual team draft; receiving input to initiate a virtual team draft within the game application; generating a virtual team comprising a plurality of virtual entities, the virtual team comprising a plurality of virtual team positions, each virtual entity associated with at least one virtual team position; generating instructions to display a user interface configured to display a virtual team interface identifying the plurality of virtual players within their associated virtual team positions during runtime of the game application; selecting a predetermined number of virtual packs from one or more virtual predetermined virtual pack groups, based at least in part on a virtual draft framework, the virtual pack comprising a plurality of a virtual pack slots, each virtual pack slot associated with a virtual profile group; for each of the selected virtual packs, identifying a virtual profile for each pack slot within the virtual pack from the associated virtual profile group, the identification of the virtual profile based, at least in part, on predetermined weighted values associated with the virtual profiles within the associated virtual profile group; generating instructions to display each of the identified virtual profiles, each virtual profile associated with a drafted virtual entity being associated with at least one team position; receiving input indicating a selection of one of the identified virtual profiles; and updating the user interface to display the drafted virtual entity associated with the selected virtual profile within the virtual team interface.

In another embodiment, a non-transitory computer-readable medium storing computer-executable instructions that, when executed by one or more computing devices, configure the one or more computing devices to execute a game application, the game application configured to perform operations during runtime of the game application comprising: generating a user interface within the video game application comprising at least one interface element configured to receive input to initiate a virtual team draft; receiving input to initiate a virtual team draft within the game application; generating a virtual team comprising a plurality of virtual entities, the virtual team comprising a plurality of virtual team positions, each virtual entity associated with at least one virtual team position; generating instructions to display a user interface configured to display a virtual team interface identifying the plurality of virtual players within their associated virtual team positions during runtime of the game application; selecting a predetermined number of virtual packs from one or more virtual predetermined virtual pack groups, based at least in part on a virtual draft framework, the virtual pack comprising a plurality of a virtual pack slots, each virtual pack slot associated with a virtual profile group; for each of the selected virtual packs, identifying a virtual profile for each virtual pack slot within the virtual pack from the associated virtual profile group, the identification of the virtual profile based, at least in part, on predetermined weighted values associated with the virtual profiles within the associated virtual profile group; generating instructions to display each of the identified virtual profiles, each virtual profile associated with a drafted virtual entity being associated with at least one team position; receiving input indicating a selection of one of the identified virtual profiles; and updating the user interface to display the drafted virtual entity associated with the selected virtual profile within the virtual team interface.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

In video games, static characters or teams may be selected using randomized selection. However, one of the problems encountered is that the use of randomly generated teams or player groups can also result in drastic imbalances between teams.

One solution to aspects of the problem is to provide a virtual drafting system within a videogame application in order to generate a group of virtual entities, such as a virtual team or virtual player group within the videogame application. The virtual drafting system can utilize a predetermined virtual draft framework to direct the draft process. The virtual draft framework can be used to provide a controlled randomized virtual draft process by using virtual profile groups to selectively control the amount of randomness during the virtual draft process. For example, in a football game a virtual drafting system can be used to draft players for a virtual team during runtime of the game application. The virtual draft can include of a predetermined number of rounds. In each round one or more virtual players can be drafted to a virtual team. Each draft round can provide a player with the opportunity to select a virtual characters that will be used within the game application. The virtual drafting process can create an engaging and balanced process for users to generate virtual teams within a game application. Though the virtual drafting system is generally described in reference to a team drafting process in a football game, the principles can be applied to other sports, such as soccer teams, basketball teams, and/or other sports teams. The process can also be applied to other types of games, such as fantasy games, role playing games, first person shooters, or other genres of video game where users generate virtual groups, teams, items, characteristics, and/or other virtual entities within a game application.

For purposes of this disclosure the term "user" can refer to a person that is operating a computing device in order to control the operation of a game application. For purposes of this disclosure the term "character" or "player" can refer to a virtual avatar, player, or character that a user can control within a game application. The character or player can be a person, vehicle, robot, creature, object, and/or any entity or item that the user can control within the game application.

Overview of Video Game Environment

Figure 1:
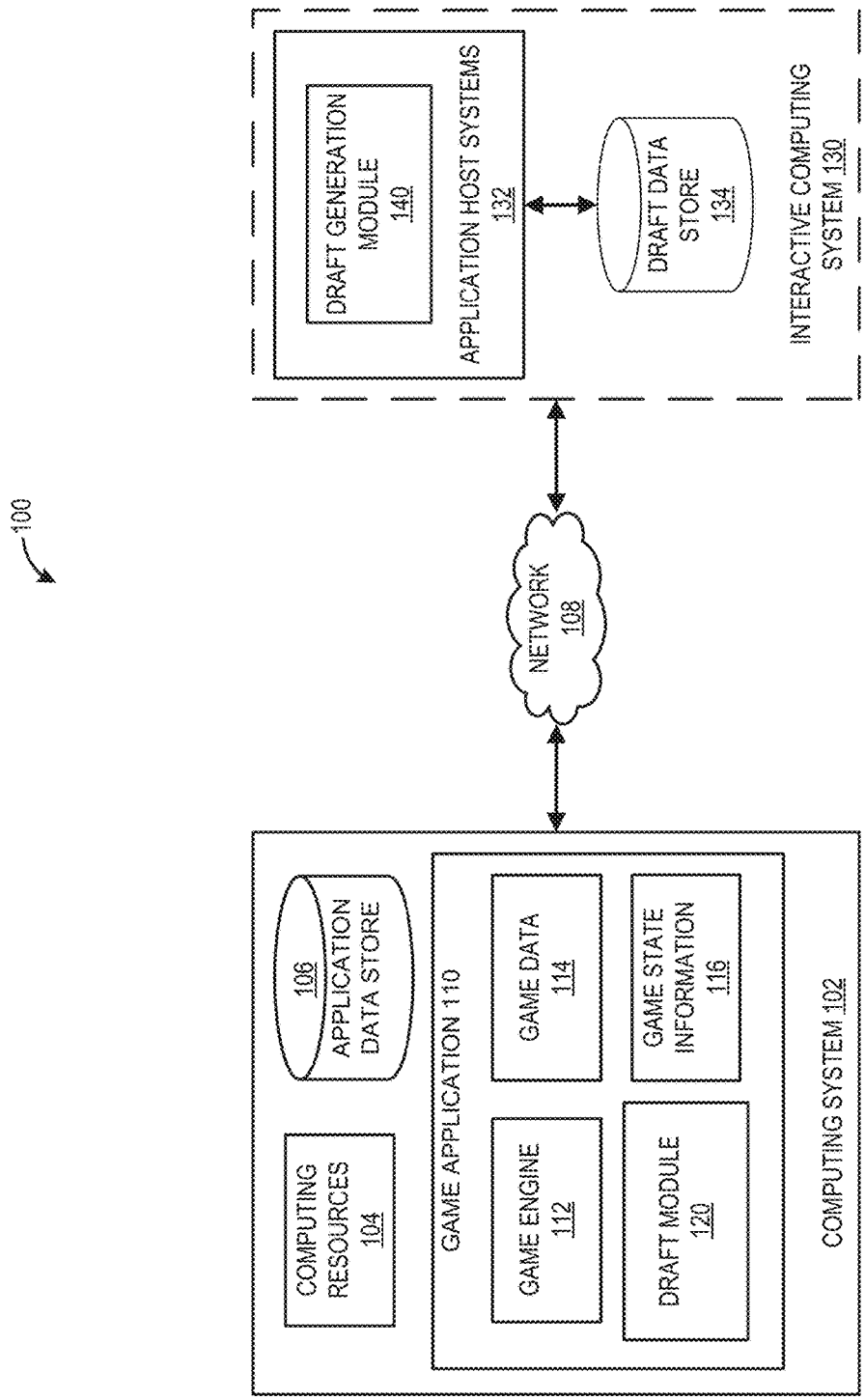
FIG. 1 illustrates an embodiment of a computing environment that can implement one or more embodiments of a player draft system.

FIG. 1 illustrates an embodiment of a computing environment 100 for implementing a draft system 120 and a draft generation system 140. The environment 100 includes a network 108, a plurality of user computing systems 102 and an interactive computing system 130, which includes application host systems 132 and a draft data store 134. To simplify discussion and not to limit the present disclosure, FIG. 1 illustrates only one user computing system 102 and one interactive computing system 130, though multiple systems may be used. The user computing system 102 may communicate via a network 108 with the interactive computing system 130. Although only one network 108 is illustrated, multiple distinct and/or distributed networks 108 may exist.

Interactive Computing System

The interactive computing system 130 can include one or more application host systems 132 and a draft data store 134. The interactive computing system 130 may include one or more computing systems configured to execute a portion of the game application 110. In some embodiments, the one or more application host systems 132 can include one or more computing devices, such as servers and databases that may host and/or execute a portion of one or more instances of the game application 110. In certain embodiments, instead of or in addition to executing a portion of the game application 110, the application host systems 132 may execute another application, which may complement and/or interact with the application 110 during execution of an instance of the application 110, such as the draft generation module 140.

Application Host System

The interactive computing system 130 may enable multiple users or computing systems to access a portion of the game application 110 executed or hosted by the interactive computing system 130. The interactive computing system 130 can include a draft generation module 140. In some embodiments, the host application system 132 may execute a hosting system for executing various aspects of a game environment. In some embodiments, the game application 110 may be a single player game in which the interactive computing system 130 provides additional functionality when connected to the instance of the game application 110. For example, the interactive computing system 130 can provide additional virtual profile drafting information to the draft module 120 based on aggregated information received from a plurality of users operating the same game application 110. In some embodiments, the application host system 132 can provide a dedicated hosting service for hosting multiplayer game instances or facilitate the creation of game instances hosted by user computing devices. In some embodiments, the host application system 132 can provide a lobby or other environment for users to virtually interact with one another.

Draft Generation Module

The draft generation module 140 can be a module that is configured to implement embodiments of the virtual profile drafting system disclosed herein. In some embodiments, the computing system 102 can communicate with an interactive computing system 130 and the interactive computing system can include an applicant host system 132 which may be configured to implement a draft generation module 140. The draft generation module 140 can be configured to implement the virtual profile drafting system and can be configured to execute rules associated with the virtual profile drafting system and be used to generate the various rule sets, virtual profiles, groups, packs, or drafting rules that are used within the game application. The draft generation module 140 can provide the virtual profile drafting information to the game application 110 and, specifically, the draft module 120. In some embodiments, the draft generation module 140 may continually update aspects of a drafting system for a specific game application such that each time a draft generation module 140 updates information about a specific game application that updated information can be provided to the game application when it loads. In some instances, it can be provided prior to loading, stored, and then executed by the game application 110 when the game loads. Aspects of the operation of the draft generation module 140 are discussed in more detail below.

Draft Data Store

The interactive computing system 130 can include one or more draft data stores 134 that are configured to store virtual profile drafting information associated with game application 110 hosted by the interactive computing system 130 and/or the application host systems 132. The draft data store 134 can include virtual profile drafting information associated with the game application 110 that is generated and aggregated by the draft generation module 140. For example, the draft data store 134 can include the virtual profile drafting rule sets, virtual profiles, groups, packs, or drafting rules that are used within the game system of game application, and/or other information used by the draft generation module 140.

Computing System

The computing system 102 includes computing resources 104 and an application data store 106. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as include a game device, a smart phone, a tablet, a personal computer, a laptop, a smart television, a car console display, a server, and the like. A more detailed description of an embodiment of a computing system 102 is described below with respect to FIG. 7.

Game Application

The user computing system 102 can execute a game application 110 based on software code stored at least in part in the application data store 106. The game application 110 may also be referred to as a videogame, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to constants, images, virtual profile drafting information, or other data structures. In the illustrated embodiment, the game application 110 includes a game engine 112, game data 114, game state information 116, and a draft module 120.

In some embodiments, the user computing system 102 is capable of executing a game application 110, which may be stored and/or executed in a distributed environment. For example, the user computing system 102 may execute a portion of a game and the application host system 132, may execute another portion of the game. For instance, the game may be a massively multiplayer online role-playing game (MMORPG) that includes a client portion executed by the user computing system 102 and a server portion executed by one or more application host systems 132.

Draft Module

The draft module 120 can perform various functions to provide virtual profile drafting functionality within the game application 110 and can operate during runtime of the game application 110. The draft module 120 can use virtual profile drafting information received from the interactive computing system 130 to perform various virtual profile drafting functions. In some embodiments, the draft module 120 can receive virtual profile drafting information from the interactive computing system 130 prior to execution of the game application, such as an update to the game application. In some embodiments, the game application 110 may receive virtual profile drafting information from the interactive computing system 130 during runtime. In such embodiments, the draft module 120 may dynamically update the virtual profile drafting information within the game application 110 based on the information received from the interactive computing system 130 during runtime. Functions of the draft module 120 can include executing rules associated with the virtual profile drafting processes, implementing various rule sets, virtual profiles, groups, packs, or drafting rules that are used during drafting systems and processes during runtime of the game application 110, or other virtual profile drafting functions within the game environment. Various aspects of the operation of the draft module 120 are described in further detail below.

Game Engine

The game engine 112 can be configured to execute aspects of the operation of the game application 110 within the computing device 100. Execution of aspects of gameplay within a game application 110 can be based, at least in part, on the user input received, the game data 114, and game state information 116. The game data 114 can include game rules, virtual profile drafting information, prerecorded motion capture poses/paths, environmental settings, constraints, skeleton models, and/or other game application information.

The game engine 112 can execute gameplay within the game according to the game rules. Examples of game rules can include rules for scoring, possible inputs, actions/events, movement in response to inputs, virtual profile drafting rules, and the like. Other components can control what inputs are accepted and how the game progresses, or other aspects of gameplay. The game engine 112 can receive the user inputs and determine in-game events, such as selections during the virtual profile drafting process, actions, jumps, runs, throws, attacks and other events appropriate for the game application 110. During runtime operation, the game engine 112 can read in game data 114 and game state information 116 to determine the appropriate in-game events, such as implementing a drafting process during runtime of the game application.

Game Data

The game data 114 can include game rules, prerecorded motion capture poses/paths, environmental settings, environmental objects, constraints, skeleton models, virtual profile drafting information, and/or other game application information. At least a portion of the game data 114 can be stored in the application data store 106. In some embodiments, a portion of the game data 114 may be received and/or stored remotely, such as in the draft data store 134, in such embodiments, game data may be received during runtime of the game application.

Game State Information

During runtime, the game application 110 can store game state information 116, which can include a game state, character states, environment states, scene object storage, virtual profile drafting information and/or other information associated with a runtime state of the game application 110. For example, the game state information 116 can identify the state of the game application 110 at a specific point in time, such as the drafting round during a virtual profile drafting process, character position, character orientation, character action, game level attributes, or other information contributing to a state of the game application. The game state information can include dynamic state information that continually changes, such as character movement positions, or static state information, such as the identification of a game level within the game.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Draft Generation Process

Figure 2:
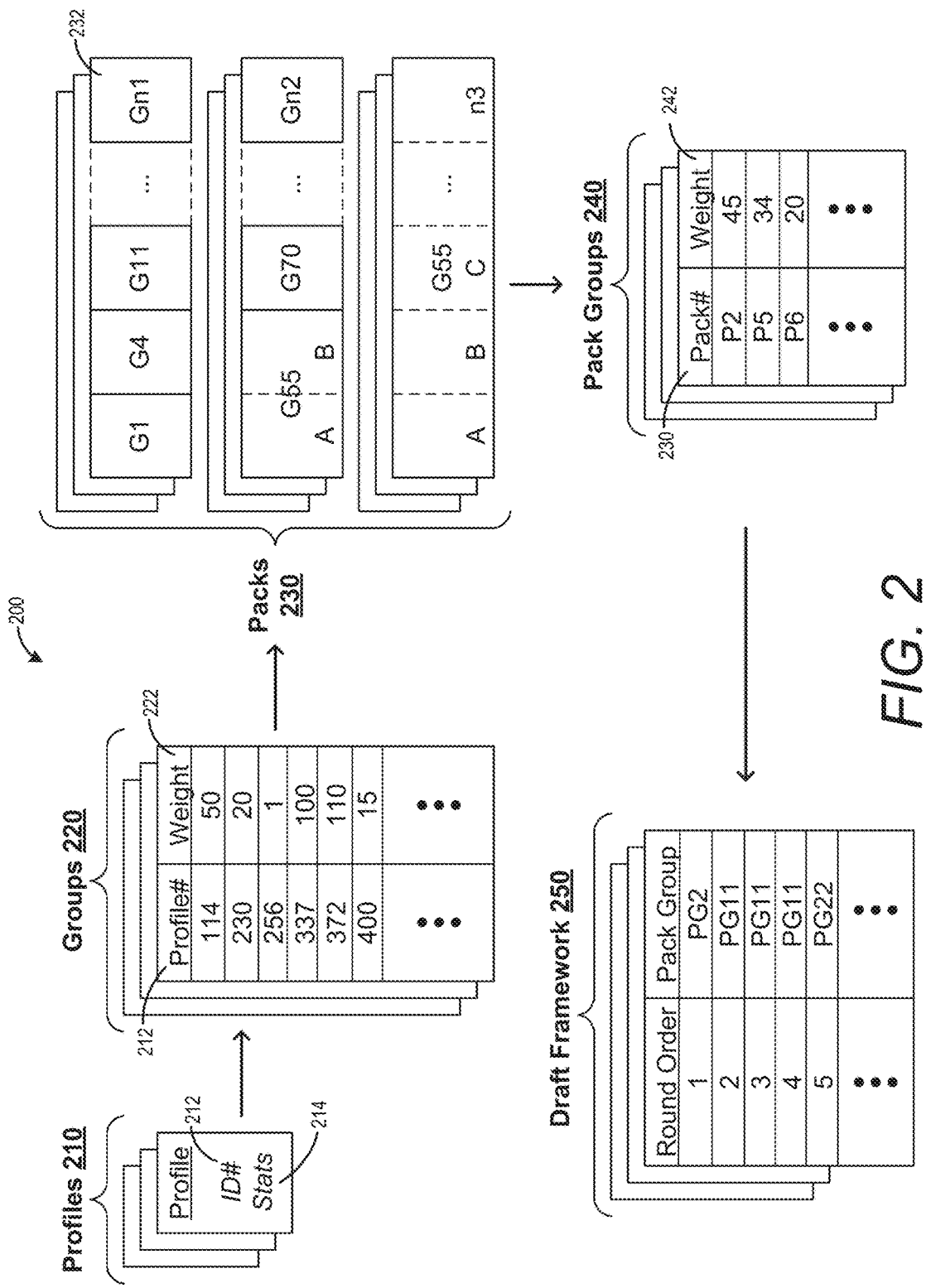
FIG. 2 illustrates an example embodiment of defining a hierarchy of virtual player profiles for implementing a player draft.

FIG. 2 illustrates an example embodiment of an illustrative hierarchy of virtual player profiles for implementing a virtual profile drafting system as disclosed herein. The hierarchy and generation of the virtual profile drafting system may be implemented by the draft generation module 140. The illustrated hierarchy of the virtual profile drafting system includes virtual profiles 210, virtual profile groups 220, packs 230, pack groups 240, and a virtual draft framework 250.

The virtual profiles 210 are at the base level of the virtual profile drafting system. A "virtual profile" can be representative of virtual elements or aspects that are used within the game application 110 during runtime. The virtual profiles may represent virtual objects, such as, for example, virtual players on a team, virtual units within an army, virtual items, in-game abilities, virtual cards, vehicles, components of a game system, other aspects of a video game, and/or other virtual goods. In some embodiments, the virtual profile may be representative of another virtual entity within the game, such as, for example, a specific football player within the game application. By receiving the virtual profile, a user can use the virtual entity associated with the virtual profile within the game application. In some embodiments, the virtual profile may be the virtual object that is used within the game application.

A virtual profile 210 can have an identification (ID) number 212 and statistics or attributes 214 associated with that virtual profile 210. The virtual profiles can be generated as a set of virtual profiles, where the size of the set can be increased or decreased as virtual profiles are added to or removed from the virtual profile set. For example, the initial set of virtual profiles may be 1000, whereas, over time the number may increase or decrease based on virtual profiles that are added or removed from the virtual profile set within the game application 110. The virtual profile 210 may have additional characteristics associated with specific mechanics of the game application 110. For example, in a football game, the virtual profile attributes may include a player position (such as, for example, quarterback, linebacker, center, and the like) and player attributes (such as, for example, size, speed, strength, and the like). The player position can identify a category or archetype of the virtual profile. The attributes associated with the virtual profile can determine the effect of the virtual profile within the game application 110. For example, a character with a speed value of one moves slower than a character with a speed value of two. These attributes can be configured and designed in accordance with the game application rules and constraints.

In some embodiments, the virtual profile 210 may be associated with a unique entity or a non-unique entity within the game application. For example, a virtual profile may be associated with real-life characters or specific characters generated for the specific game application. A user may be only able to hold one of a unique virtual profile, and may hold a plurality of copies of non-unique virtual profiles. For example, a football player in a football game may have an identification number that uniquely identifies a specific player (for example, Jerry Rice). The virtual profile may identify an archetype or class of character (for example, cornerback, running back, archer, foot soldier, and the like) that a user can have multiple copies of within the game application 110.

The virtual draft generation system can generate virtual profile groups 220 including a plurality of virtual profiles 210. The virtual profiles 210 selected for a virtual profile group 220 may be based on the specific rules of the game application. In some instances, the virtual profile groups 220 may be virtual profiles that have specific characteristics or attributes. For example, in a football game, the system may have a quarterback group that only includes quarterbacks, and may include fifty different quarterbacks. In some instances, the groups may be further refined. For example, the group may only include quarterbacks that have a legendary rating or above. In some embodiments, the virtual profile groups can be generated automatically based on the characteristics or attributes associated with the virtual profiles. In some embodiments, the virtual profile groups 220 may be generated manually.

Within a virtual profile group 220, each virtual profile 210 may be associated with a virtual profile weight 222. The virtual profile weight 222 can be representative of the probability that a virtual profile 210 is selected within the virtual profile group 220. The virtual profile weights 222 can be used during virtual profile selection process for selecting one or more virtual profiles within a virtual profiles group. During a random or pseudo-random selection process, the virtual profile drafting system can use a selection algorithm that uses the virtual profile weight to identify a virtual profile 210 within the virtual profile group 220. The weights selected for each virtual profile can be specific to the virtual profile group 220 and relative to the other virtual profiles within the virtual profile group 220. For example, in a quarterback group, a legendary quarterback may have a very low virtual profile weight, which is representative of a very small likelihood that the legendary quarterback would be selected within the group. Whereas, a common quarterback may have a much higher weight, which is representative of a higher likelihood that the common quarterback would be selected relative to the legendary quarterback. In an illustrative example, a quarterback group may include have 30 common quarterbacks, 10 uncommon quarterbacks, 5 rare quarterbacks, and one legendary quarterback. Appropriate weights can be applied to each virtual profile within the virtual profile group 220 to account for the rarity of the individual virtual profiles.

The weights associated with those virtual profiles can be different within each group. For example, in a group consisting of legendary quarterbacks, each of the legendary may have an equal weight. In another group that includes all levels of quarterbacks within the game, the legendary quarterbacks may have significantly lower weights than the common quarterbacks. Even though a virtual profile may be in multiple groups, each group may assign different weights to the virtual profile within the group. In some embodiments, the virtual profiles may have absolute weights, which can apply regardless of the virtual profile group 220.

After the virtual profile groups 220 have been generated, a pack 230 can be generated using one or more of the virtual profile groups 220. A pack 230 can consist of any number of pack slots 232, with each pack slot 232 being associated with a virtual profile group 220. As an example, a pack 230 may include three pack slots 232 with each pack slot 232 being associated with a different virtual profile group 220. In some instances, multiple pack slots may be associated with the same virtual profile group 220. When a pack 230 is selected during a draft, a virtual profile 210 is selected for each pack slot from the appropriate virtual profile group 220 in accordance with the appropriate selection algorithm. For example, the virtual profile 210 may be selected randomly or pseudo-randomly based at least in part on the virtual profile weights of the virtual profiles within the virtual profile group 220.

With specific reference to FIG. 2, the top pack includes at least three pack slots 232 associated with three different virtual profile groups 220. The first pack slot 232 is associated with virtual profile group one, the second pack slot 232 is associated with virtual profile group four, and the third pack slot 232 is associated with virtual profile group eleven. One virtual profile would be selected from the virtual profile group associated with each virtual profile group based at least in part on the virtual profile weights associated with the appropriate group. Each virtual profile group may be associated with different attributes of the virtual profiles. For example, group one may be a linebacker group, group four may be an offensive line group and group eleven may be a running back group, which would give three separate options within that pack for a user to select a virtual player. Using this system, randomness and diversity of the packs can be better controlled.

As illustrated, in some instances, multiple pack slots 232 can be associated with the same virtual profile group 220. Any number of packs 230 can be generated using the virtual profile groups 220. The packs 230 can be generated in accordance with the virtual profile drafting rules and demands of the game application. For example, in a football game, the packs may include quarterback pack, a linebacker pack, an offensive pack, a defensive pack, a random player pack, and/or any other pack used within the game application.

After the packs 230 are generated, the packs 230 can be grouped together into various pack groups 240. Each pack group 240 can include a one or more packs 220. For example, in a football game, pack groups may include an offensive pack group, a defensive pack group, and/or other type of pack group for use within the drafting process.

Individual packs 230 can be associated with more than one pack group 240. Packs 230 within a pack group 240 can have pack weights 242. The pack weight 242 can be representative of the probability that a pack 230 is selected within the pack group 240. For example, a pack 230 that has a higher pack weight 242 relative to other packs 230 within the pack group 240 has a higher probability of being selected.

After the pack groups 240 have been generated, a virtual draft framework 250 can be generated to determine the number of packs 230 that are used during a drafting process. The virtual draft framework 250 can define the number of draft rounds, the order of the draft rounds, the pack groups 240 used for each round, or other details associated with the implementation of the drafting process during runtime of the game application. The draft can have a defined number of rounds and different pack groups 240 can be selected to provide packs 230 for one or more rounds in a defined order. In each round of the draft, a pack 230 is provided by an identified pack group. A pack 230 is selected based on the virtual profile pack weight defined within the pack group 240. In the illustrated example, in round one, the pack 230 is provided by pack group two. In the subsequent three rounds, packs 230 are provided from pack group eleven. In the next round, the pack 230 is provided by pack group thirteen, and so forth. The draft structure 250 can be implemented by the draft module 120 during runtime of the game application.

Team Generation Process

Figure 3:
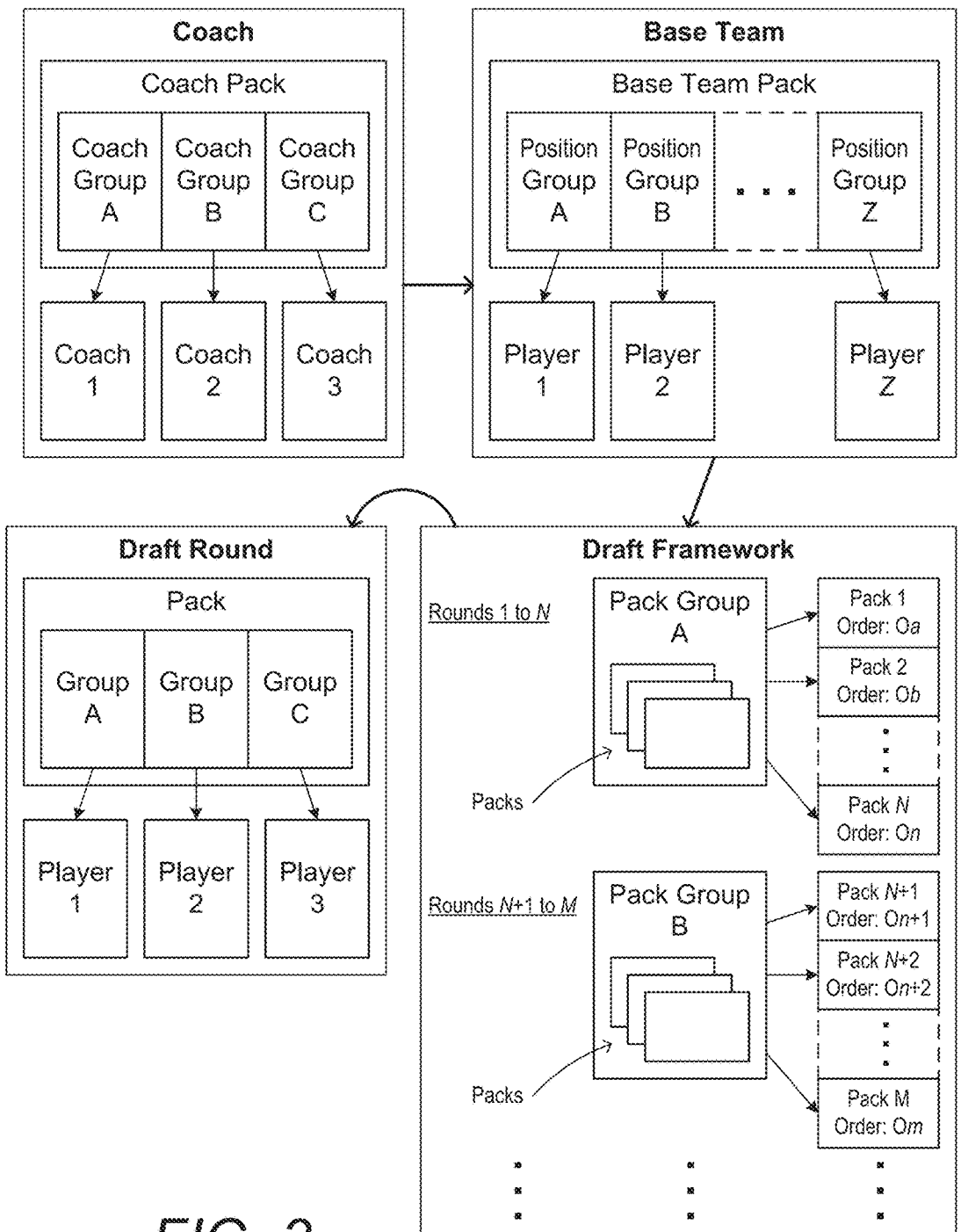
FIG. 3 illustrates an example embodiment of a player draft using the hierarchy of virtual player profiles to provide a controlled yet randomized experience.

FIG. 3 illustrates an example embodiment of a draft process using the hierarchy of virtual player profiles to provide a controlled yet randomized draft process. The illustrated embodiment provides an example of a process for generation of a team within a game application. In the illustrated embodiment, the draft process includes coach selection, base team generation, and implementation of the draft structure, which includes a defined number of draft rounds.

In some embodiments, the first part of the draft process includes the selection of a coach. The coach can be selected using a coach pack. The coach pack can be a pack 230 that is specific to coaches. The coach pack can include a defined number of pack slots 232, such as three, with each pack slot 232 being associated with a specific coach group, which can be instances of virtual profile groups 220. In some instances, each coach group may be associated with a specific play style within the game application. In the illustrated embodiment, the draft process can randomly select one of three coaches. Each coach can be selected from a coach group. Each coach group is an embodiment of a digital profile group 220. In other embodiments, the user may be presented with more or less options. The selection of the coach can also define other characteristics of the team. For example, a coach may have a specific playbook which is used to identify plays that can be used within the game application or may have specific skills or abilities that can influence how the user plays the game.

After the selection of the coach, the base team can be generated using a base team pack. The base team pack can include one or more pack groups associated each position on the team. For example, if the team has twenty five positions, the base team pack can include twenty five group slots with a virtual profile group associated with each position. The base team pack provides starting characters that populate the base team. Rather than providing a standardized team, the base team pack can be used to provide variation to each of the characters on the base team. The starting players may be generally average, with some variations. This selection process provides the user with an opportunity to upgrade the base team during the draft rounds. In some embodiments, the pack group may include an advanced or better player within the base team pack. In some embodiments, the selected coach may determine the base team pack that is used to generate the base team. In some embodiments, the base team pack may not include all of the positions on the base team or may include more than one player for some of the positions. The process of generating the base team can be done automatically without input from a user.

After the base team is generated, the draft structure 250 can be used to determine how the draft proceeds. During team drafting, the user has the opportunity to add additional players to the team. The new players received during the draft rounds may be added to the team and/or may replace existing players on the team. The draft structure defines a number of draft rounds that are conducted during the draft process. After the base team has been selected and presented to the user, the user can enter the draft process. The draft structure can have any number of rounds from one to an integer, which may be 10 rounds, 15 rounds, 20 rounds, or any number of rounds. For each draft round, a pack is randomly or pseudo-randomly selected from an identified pack group. The draft structure 250 defines the number of virtual profile packs that are provided by each pack groups. The defined number of packs 230 from each pack group 240 can be randomly or pseudo-randomly selected based on pack weights 242 within each pack group.

The card packs can be ordered in accordance with the draft structure 250. In some embodiments, the draft structure 250 can determine a priority for ordering the selected packs during the draft rounds. In the illustrated example, Pack Group A provides packs for round one through a defined draft round. A defined number of packs within Pack Group A would be selected and sequentially ordered in accordance with the defined draft structure 250. In some embodiments, if Pack Group A were to provide three packs, the order in which the three packs are presented during the draft rounds can be based on relative pack priorities within the pack group. After each of the draft rounds assigned to pack group A is complete, pack group B provides the defined number of packs for each of the draft rounds assigned to pack group B. This process can continue until the defined number of draft rounds is complete. In some embodiments, the draft module 120 may select and order the packs in accordance with the defined draft structure when the draft is initiated. In such an embodiment, the draft rounds are defined when the draft is initiated and the do not change based on the choices of the user. In some embodiments, the draft module 120 can dynamically modify the draft structure based on the choices of the user during the drafting process. For example, during the draft process, the pack group used for each round may be determined at each round based the selections by the user of virtual profiles made during previous rounds.

For each draft round, at least one virtual profile for each pack slot within the pack is selected based, at least in part, on the virtual profile weights associated with the virtual profile group. In some embodiments, all the selections of virtual profiles can be done at the same time at the beginning of the draft before the user selects any virtual profiles. In some embodiments, the system may dynamically change some of the packs based on selections that are made by the user during the draft.

Draft Process User Interfaces

Figure 4A:
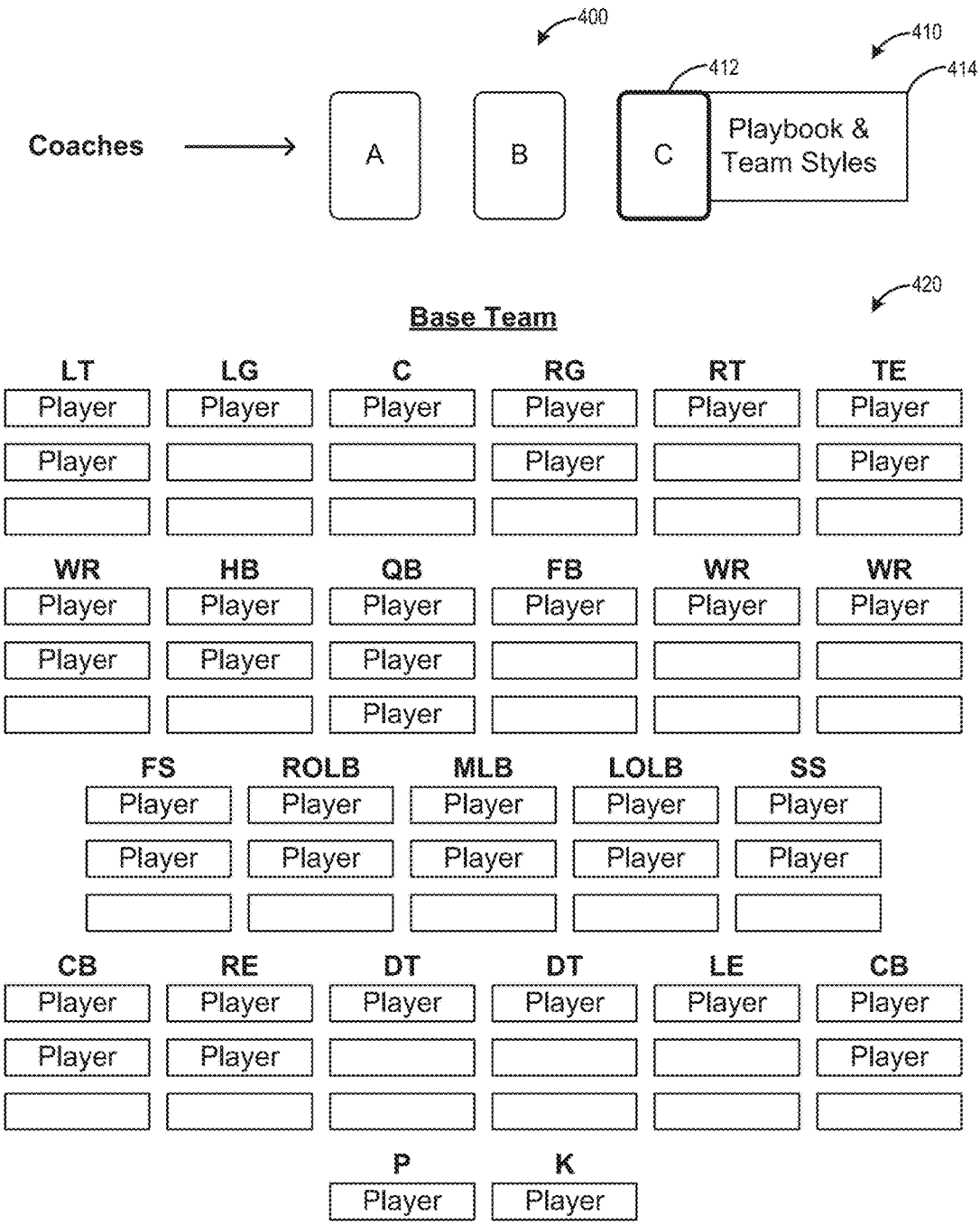
FIG. 4A illustrates an embodiment of an example user interface generated for a player draft illustrating a random base team and a selection of coaches.

FIG. 4A illustrates one embodiment of an example user interface 400 generated for a player draft illustrating a random base team and a selection of coaches. In the illustrated embodiment, the game application generates the user interface 400 in response to the user initiating a draft process. The user interface 400 includes a coach section 410 that provides the user with an interface to select a coach and a team section 420 that provides access to the user's team. In this embodiment, the user is given the option to select one of three coaches. Each coach has additional information 412 that the user can access by selecting coach. For example, each coach can have specific playbooks and/or team styles that a user can access when selecting or interacting with a coach within the user interface. After a coach is selected, the draft process can proceed to one or more draft rounds of the draft process. The team section 420 of the user interface can provide the user with access to additional information associated within each player within the base team. For example, a user can select any of the players within the base team to view attributes associated with the player.

Figure 4B:
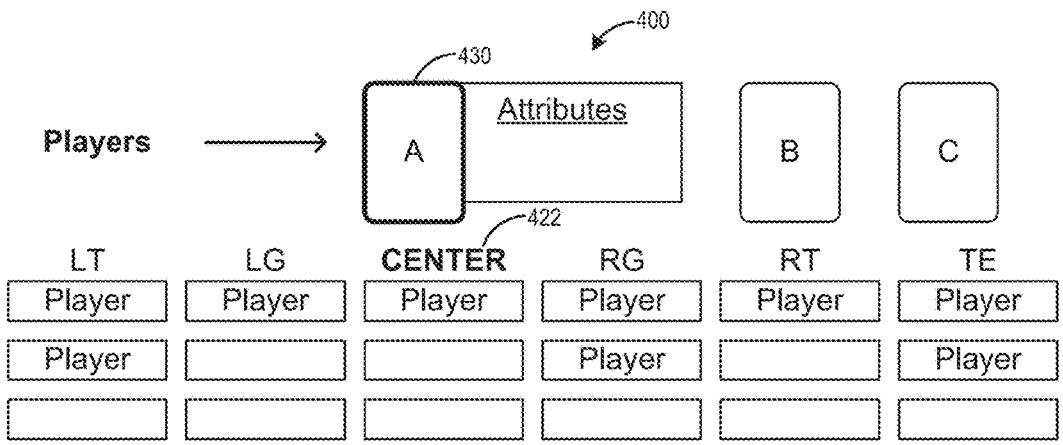
FIGS. 4B, 4C, 4D, and 4E illustrate embodiments of example user interfaces generated during a round of a player draft.
Figure 4C:
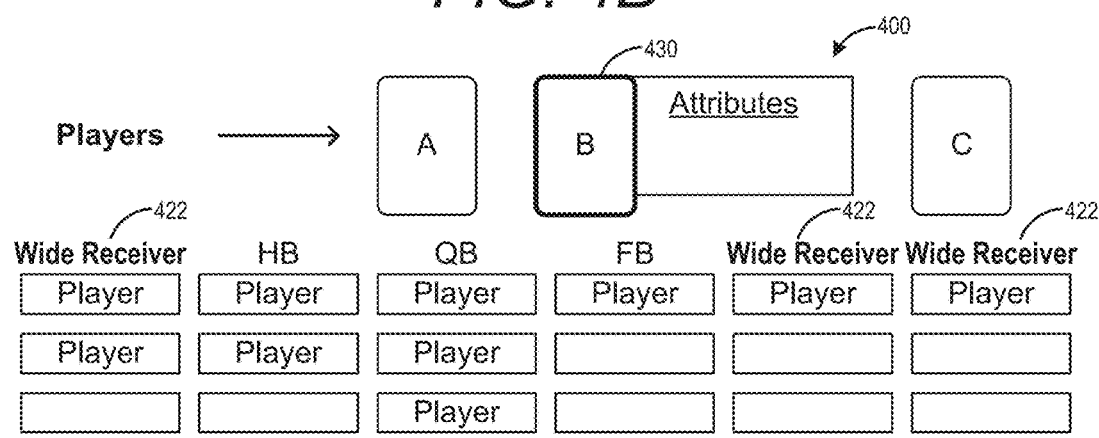
Figure 4D:
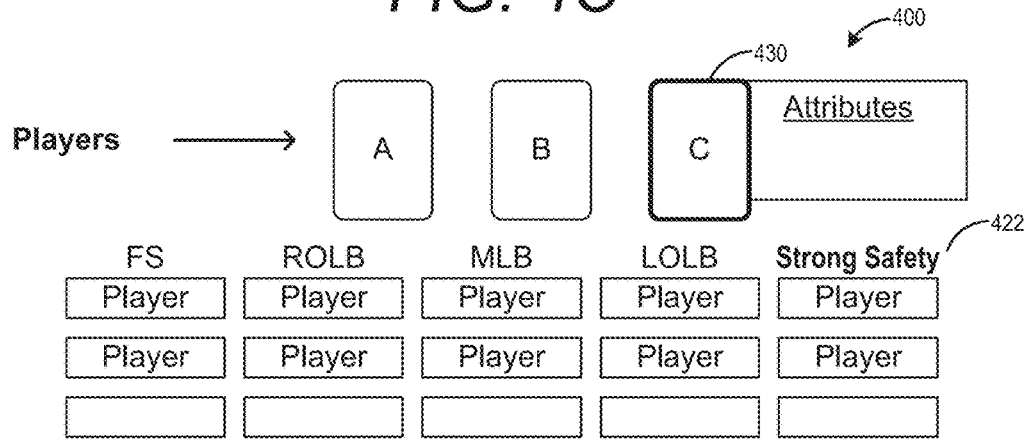

FIGS. 4B, 4C, and 4D illustrate embodiments of example user interfaces generated during a round of a player draft. During a draft round, the user interface generates each virtual profile 430 selected from a pack for display to the user. When the user selects or otherwise interfaces with a virtual profile 430, the user interface can provide additional information 432 associated with the virtual profile 430. The user interface automatically updates and modifies the representation of the virtual profile 430 to expand and display the additional information 432. The additional information can include attributes associated with the player (such as, for example, a player rating, size, strength, position, ball handling, and the like). Additionally, when a virtual profile 430 is selected, the user interface can automatically display at least a portion of the team section in order to compare the player associated with the virtual profile 430 to existing players on the user's team. The user interface can also modify portions of the team section 420, such as the position heading 422, to highlight the player that is being compared to the virtual profile 430.

For example, in FIG. 4B, when a user select or interacts with player A, the sets of additional information associated with player A are expanded for the user and the "CENTER" position is highlighted and displayed below the player selection boxes. In FIG. 4C, when a user select or interacts with player B, the additional information associated with player B are expanded for the user and the attributes associated with player A are no longer displayed. The "Wide Receiver" position is highlighted and displayed below the player selection boxes. In FIG. 4D, when a user select or interacts with player C, the additional sets of information associated with player C are expanded for the user and the attributes associated with player B are no longer displayed. The "Strong Safety" position is highlighted and displayed below the player selection boxes.

Figure 4E:
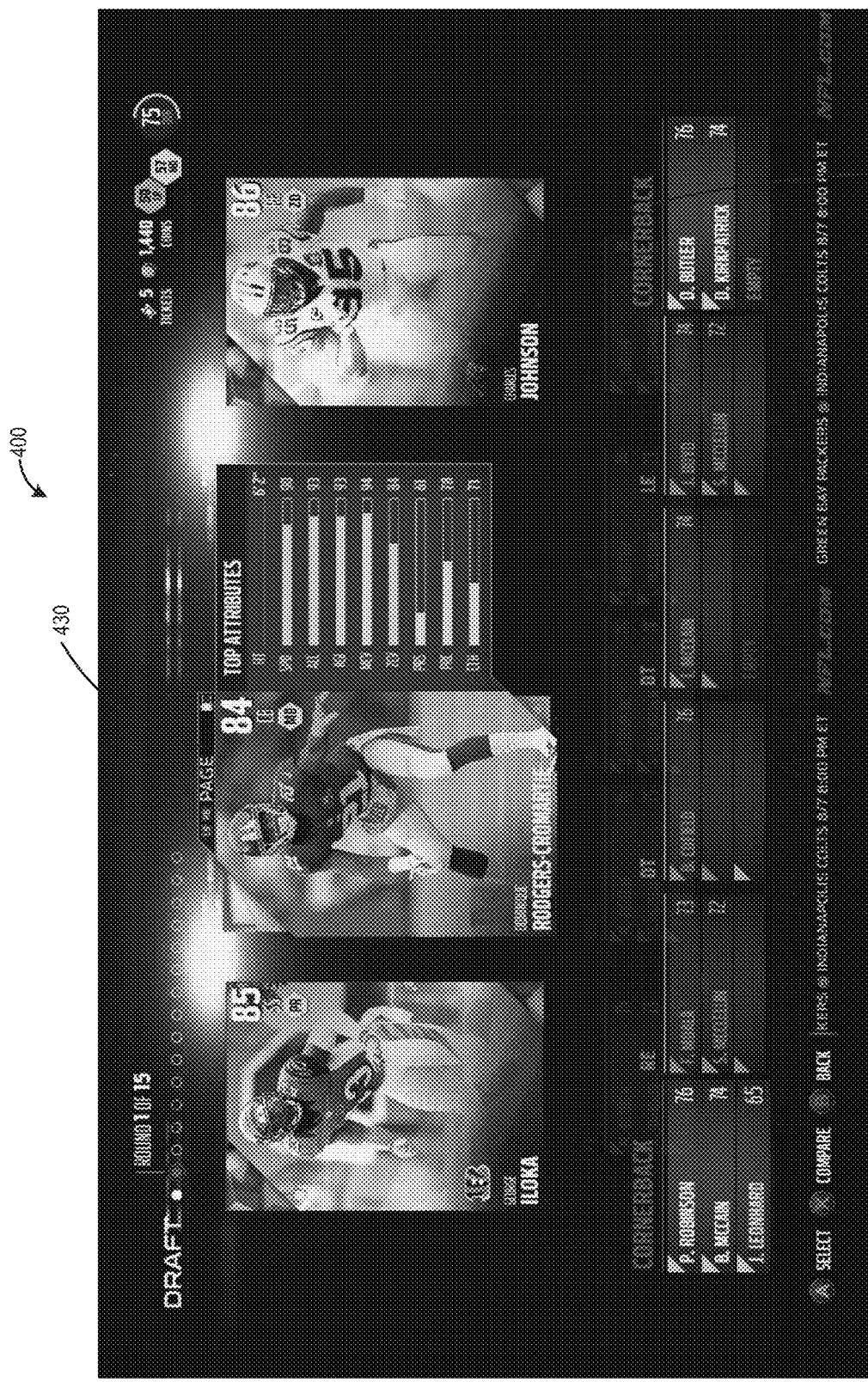

FIG. 4E illustrates another embodiment of a user interface that is generated for a draft round. In the illustrated embodiment, a player 430 is selected and additional information 432 associated with the virtual profile is displayed. Additionally, the players on the base team associated with the selected virtual profile are highlighted to help the user see differences between the existing players and the selected player. After a user makes a final selection of a virtual profile, the player associated with the draft virtual profile is added to the user's team.

Draft Generation Process

Figure 5:
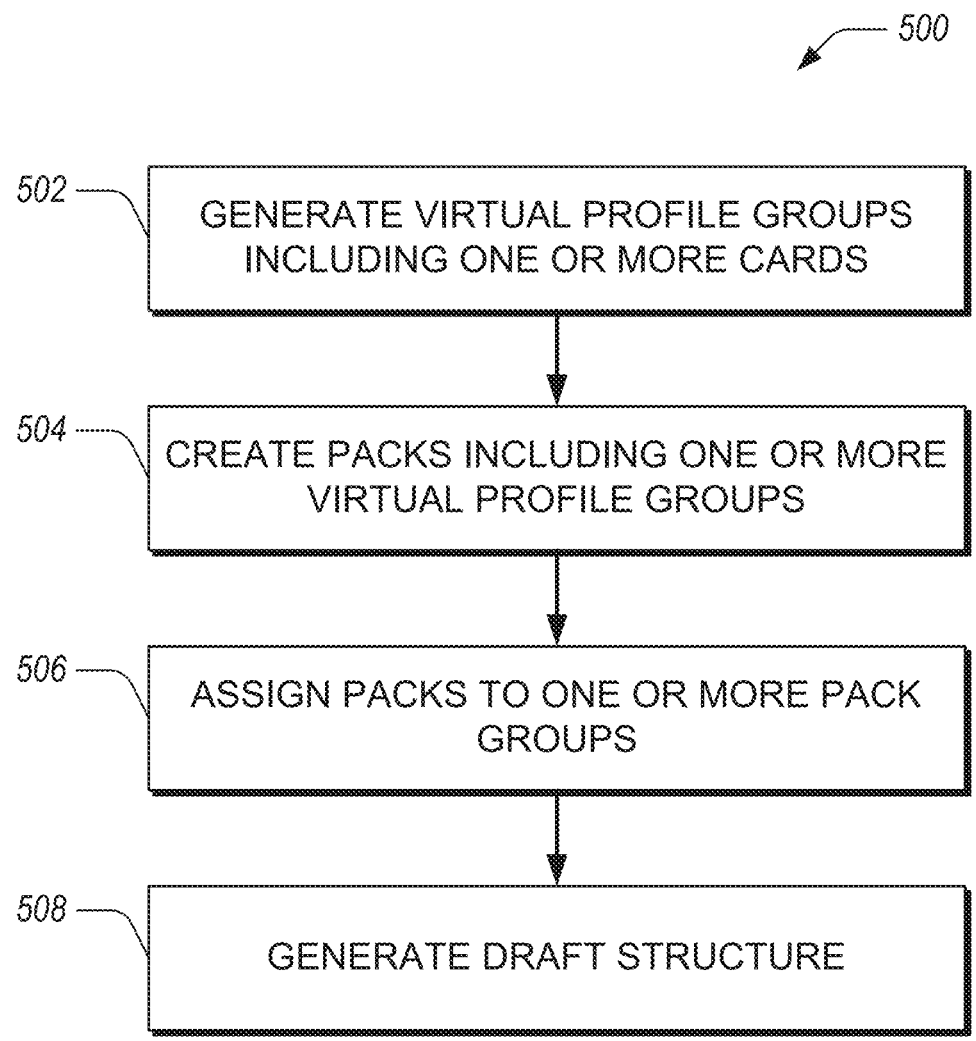
FIG. 5 illustrates an embodiment of a flowchart of a player draft generation process.

FIG. 5 illustrates an embodiment of a flowchart for a process for generating player drafts within a game environment of a game application. The process 500 can be implemented by any system that can generate player draft information for a game application. For example, the process 500, in whole or in part, can be implemented by a game application 110, a game engine 114, a draft module 120, an interactive computing system 130, an application host system 132, a draft generation module 140, and/or another system. Although any number of systems, in whole or in part, can implement the process 500, to simplify discussion, the process 500 will be described with respect to particular systems. Further, although embodiments of the process 500 may be performed with respect to variations of systems comprising various game application environments, to simplify discussion, the process 500 will be described with respect to the interactive computing system 130.

At block 502, the system can generate virtual profile groups including a plurality of virtual profiles. Each virtual profile within a virtual profile group can have a virtual profile weight associated with the virtual profile. The virtual profile weight can be representative of the probability that a virtual profile is selected within the virtual profile group. The virtual profiles can be representative of virtual elements or aspects within the game application that are used within the game application. The virtual profiles may represent players on a team, units within an army, virtual items, in-game abilities, vehicles, components of a game system, or other aspects of a video game.

At block 504, packs can be created. The packs have one or more pack slots. The number of pack slots may be a pre-determined number associated with a particular game as well as by other characteristics. Each pack slot can be associated with a virtual profile group. As an example, a pack may include three pack slots with each pack slot being associated with a virtual profile group. In some instances, multiple pack slots may be associated with the same virtual profile group.

At block 506, the packs can be assigned to one or more pack groups. The number of pack groups may be a pre-determined number associated with a particular game as well as by other characteristics. Each pack group can include a one or more packs. After the packs have been generated which may be any number of packs the packs can then have groups which consist of a plurality of packs. Packs within a pack group can have pack weights. The pack weight can be representative of the probability that a pack is selected within the pack group. For example, if a pack has a higher pack weight relative to other packs within the pack group, that pack has a higher probability of being selected. In other embodiments, a higher weight may indicate a lower probability of being selected. The pack groups may have a specific theme or attribute associated with the group. For example, a pack group may only include packs for offensive players, defensive players, or any other desired attribute or theme.

At block 508, a draft structure can be generated to determine the number of packs that are used during a drafting process. The draft structure can define the number of draft rounds, the order of the draft rounds, the pack groups used for each round, or other details associated with the implementation of the drafting process during runtime of the game application. The draft can have a defined number of rounds and different pack groups can be selected to provide packs for one or more rounds in a defined order. In each round of the draft, a pack is provided by an identified pack group. A pack is selected based on the pack weight defined within the pack group.

Team Draft Selection Process

Figure 6:
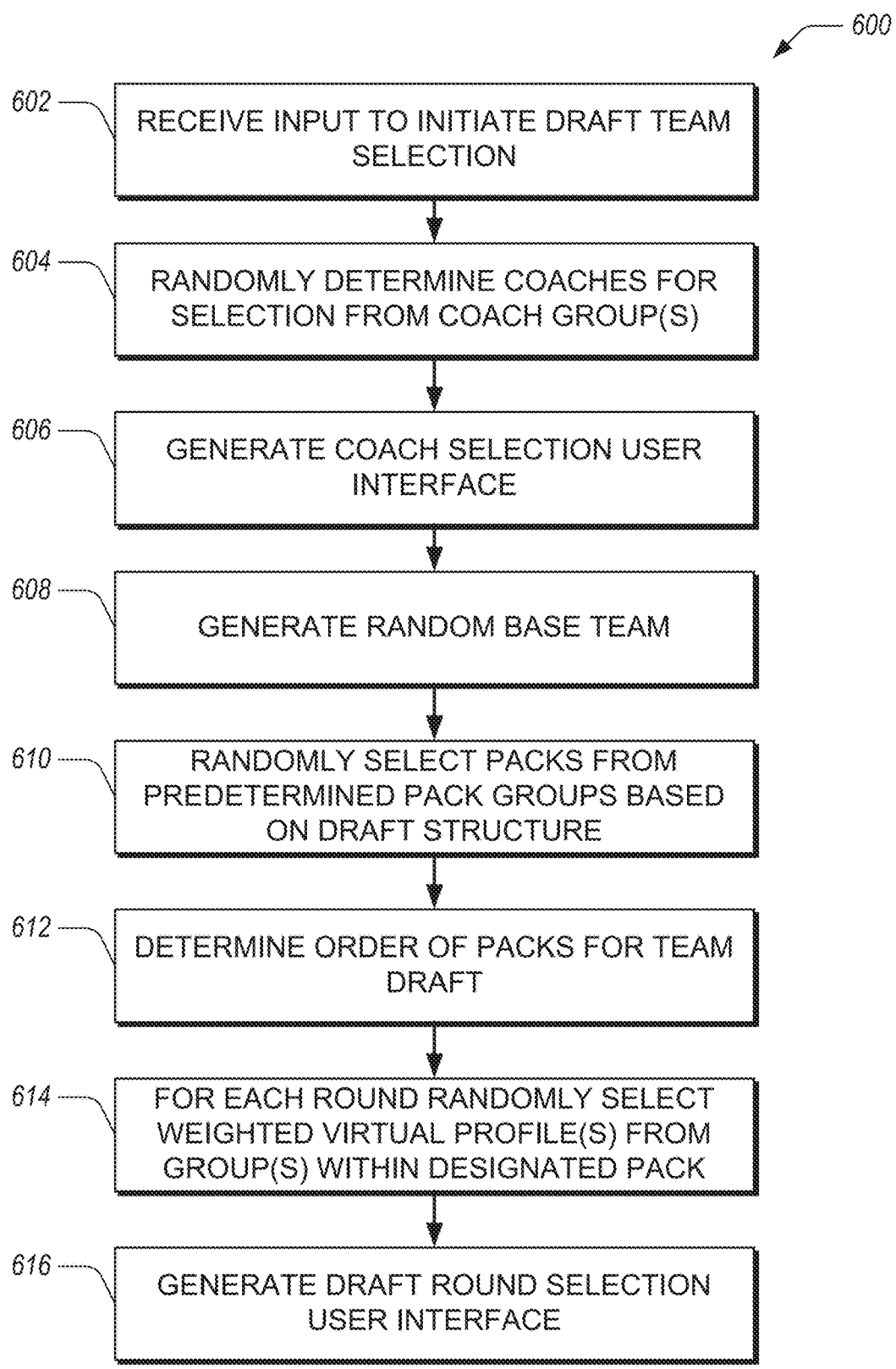
FIG. 6 illustrates an embodiment of a flowchart of a process for executing a player draft within a game application.

FIG. 6 illustrates an embodiment of a draft selection process for a game application. The process 600 can be implemented by any system that can execute a virtual profile drafting process during runtime of a game application. For example, the process 600, in whole or in part, can be implemented by a game application 110, a game engine 114, a draft module 120, an interactive computing system 130, an application host system 132, a draft generation module 140, and/or another system. Although any number of systems, in whole or in part, can implement the process 600, to simplify discussion, the process 600 will be described with respect to particular systems. Further, although embodiments of the process 600 may be performed with respect to variations of systems comprising various game application environments, to simplify discussion, the process 600 will be described with respect to the game application 110.

At block 602, the game application receives user input to initiate draft team selection. The game application can provide a user interface with at least one user control that can provide functionality to the user to initiate a draft team selection during runtime of the game application.

At block 604, the game application can randomly or pseudo-randomly determine coaches for selection from a number of coach groups. The coach can be selected using a coach pack. The coach pack can be a pack 230 that is specific to coaches. The coach pack can include a defined number of pack slots, such as three, four, or any defined number of options, with each pack slot being associated with a specific coach group, which can be instances of virtual profile groups. The number of pack slots may be a pre-determined number associated with a particular game as well as other characteristics. In some instances, each coach group may be associated with a specific play style within the game application.

At block 606, the game application generates instructions for generating a coach selection user interface for transmission to another system or module or generates the coach selection process. The game application can generate the user interface in response to the user initiating a draft process. The user interface can includes a plurality of sections, such as a coach section that provides the user with an interface to select a coach and a team section that provides access to the user's team.

At block 608, the base team can be generated. The base team can be generated using a base team pack. The base team pack can include a one or more pack groups associated each position on the team. For example, if the team has twenty five positions, the base team pack can include twenty five group slots with a virtual profile group associated with each position. The base team pack provides starting characters that populate the base team.

At block 610, the game application can randomly or pseudo-randomly select packs from the predetermined pack groups based at least in part on the draft structure. For each draft round, a pack is randomly or pseudo-randomly selected from an identified pack group. The draft structure defines the number of packs that are provided by each pack groups. The defined number of packs from each pack group can be randomly selected based on pack weights within each pack group.

At block 612, the game application can determine the order of packs for the draft. The packs can be ordered based on a defined priority of the packs. Each pack group can assign the order in which packs selected from the pack group are presented during the draft rounds.

At block 614, for each round virtual profiles within each pack are selected based at least in part on virtual profile weights associated with the virtual profile group. In some embodiments, some or all the random selections can be done at the same time and/or at the beginning of the draft before the user selects the virtual profiles. In some embodiments, the system may dynamically change some of the packs based on selections that are made by the user during the draft.

At block 616, the game application generates instructions to generate a draft round selection user interface for transmission to another system or module or generates the draft round selection user interface. The user interface generates each virtual profile selected from a pack for display to the user. When the user selects or otherwise interfaces with a virtual profile, the user interface can provide additional information associated with the virtual profile. The user interface can automatically update and modify the representation of the virtual profile to expand and display the additional information. The additional information can include attributes associated with the player (such as, for example, a player rating, size, strength, position, ball handling, and the like). Additionally, when a virtual profile is selected, the user interface can automatically display at least a portion of the team section in order to compare the player associated with the virtual profile to existing players on the user's team. The user interface can also modify portions of the team section, such as the position heading, to highlight the player that is being compared to the virtual profile.

Overview of Computing Device

Figure 7:
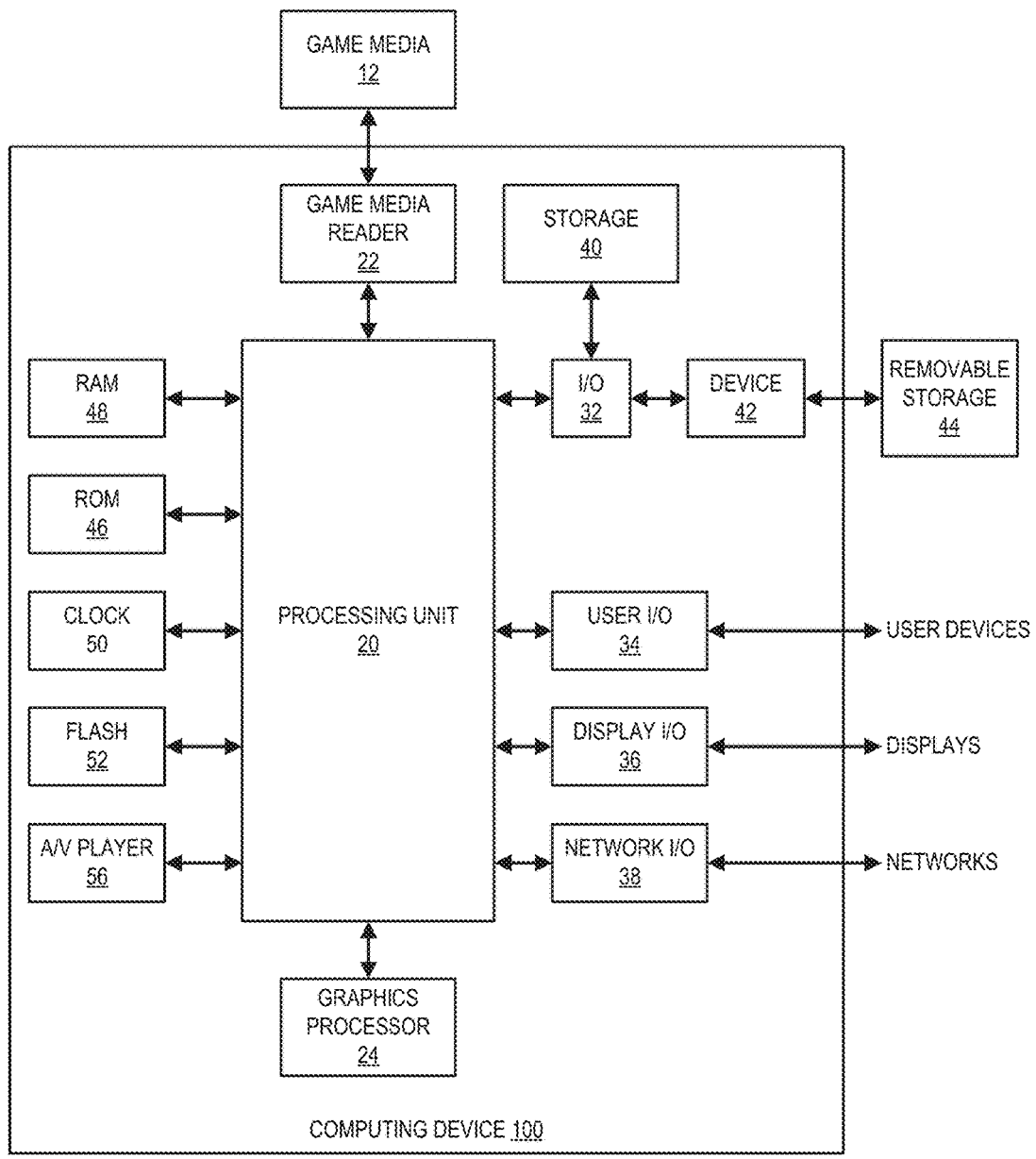
FIG. 7 illustrates an embodiment of a computing device.

FIG. 7 illustrates an embodiment of computing device 10 according to the present disclosure. Other variations of the computing device 10 may be substituted for the examples explicitly presented herein, such as removing or adding components to the computing device 100. The computing device 10 may be any computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the draft selection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application draft selection.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such as display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or the entire signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:
1. A system comprising:
   a data store configured to store virtual profile data associated with a plurality of virtual entities and virtual draft framework data;
   one or more processors configured with computer executable instructions that cause the one or more processors to execute a game application, the game application configured to:
      generate a user interface within the game application comprising at least one interface element configured to receive input to initiate a virtual team draft;
      receive input to initiate a virtual team draft within the game application;
      generate a virtual team comprising a plurality of virtual entities, the virtual team comprising a plurality of virtual team positions, each virtual entity associated with at least one virtual team position;
      generate instructions to display a user interface configured to display a virtual team interface identifying the plurality of virtual entities within their associated virtual team positions during runtime of the game application;

select a predetermined number of virtual packs from one or more virtual predetermined virtual pack groups, based at least in part on a virtual draft framework, wherein the virtual draft framework comprises a plurality of draft rounds, wherein in each draft round a virtual pack is selected from a virtual pack group, each virtual pack group comprising a plurality of different virtual packs, each virtual pack comprising a plurality of a virtual pack slots, each virtual pack slot associated with a virtual profile group;

for each of the selected virtual packs,
identify a virtual profile for each virtual pack slot within the virtual pack from the associated virtual profile group, the identification of the virtual profile based, at least in part, on predetermined weighted values associated with the virtual profiles within the associated virtual profile group;
generate instructions to display each of the identified virtual profiles, each virtual profile associated with a drafted virtual entity being associated with at least one team position;
receive input indicating a selection of one of the identified virtual profiles; and
update the user interface to display the drafted virtual entity associated with the selected virtual profile within the virtual team interface;

execute a virtual game using the virtual team within a virtual environment of the game application, wherein each virtual profile assigned to a virtual team position is represented by a virtual entity within the virtual environment when participating within the virtual game;

receive user input from a first user to perform a first action within the virtual environment during the virtual game by at least one of the virtual entities on the virtual team; and in response to the user input, execute the first action within the virtual environment during the virtual game by the at least one of the virtual entities.

2. The system of claim 1, wherein the game application is further configured to determine an order for the selected virtual packs based at least in part on prioritization information associated with each of the selected virtual packs and a predetermined group order.

3. The system of claim 1, wherein the game application is further configured to:
select a plurality of virtual coaches based at least in part on weighted values associated each of the virtual coaches, wherein a virtual coach is selected for each of a plurality of coach slots within a coach pack, and
generate instructions to display an interface displaying the selected virtual coaches.

4. The system of claim 1, wherein the game application is further configured to generate instructions to display attributes and a position associated with each of the identified virtual profiles.

5. The system of claim 1, wherein the game application is further configured to determine a virtual team for deployment within the game application based at least in part on virtual entities in the initial virtual team and at least one of the virtual entities selected during the virtual team draft.

6. The system of claim 1, wherein the virtual team includes a plurality of virtual entities associated with each position of the virtual team.

7. The system of claim 1, wherein the game application is further configured to:
identify an indication of interest with a first of the identified virtual profiles;
display attributes associated with the first identified virtual profile; and
display at least a portion of the virtual team interface identifying other virtual entities associated with the at least one team position associated with the first identified virtual profile.

8. A method comprising:
under control of a computing system comprising computer hardware, the computing system configured with computer executable instructions to execute a game application, the game application configured to perform operations during runtime of the game application including,
generating a user interface within the game application comprising at least one interface element configured to receive input to initiate a virtual team draft;
receiving input to initiate a virtual team draft within the game application;
generating a virtual team comprising a plurality of virtual entities, the virtual team comprising a plurality of virtual team positions, each virtual entity associated with at least one virtual team position;
generating instructions to display a user interface configured to display a virtual team interface identifying the plurality of virtual entities within their associated virtual team positions during runtime of the game application;
selecting a predetermined number of virtual packs from one or more virtual predetermined virtual pack groups, based at least in part on a virtual draft framework, wherein the virtual draft framework comprises a plurality of draft rounds, wherein in each draft round a virtual pack is selected from a virtual pack group, each virtual pack group comprising a plurality of different virtual packs, each virtual pack comprising a plurality of a virtual pack slots, each virtual pack slot associated with a virtual profile group;
for each of the selected virtual packs,
identifying a virtual profile for each pack slot within the virtual pack from the associated virtual profile group, the identification of the virtual profile based, at least in part, on predetermined weighted values associated with the virtual profiles within the associated virtual profile group;
generating instructions to display each of the identified virtual profiles, each virtual profile associated with a drafted virtual entity being associated with at least one team position;
receiving input indicating a selection of one of the identified virtual profiles; and
updating the user interface to display the drafted virtual entity associated with the selected virtual profile within the virtual team interface;
executing a virtual game using the virtual team within a virtual environment of the game application, wherein each virtual profile assigned to a virtual team position is represented by a virtual entity within the virtual environment when participating within the virtual game receiving user input from a first user to perform a first action within the virtual environment during the virtual game by at least one of the virtual entities on the virtual team; and in response to the user input, executing the first action within the virtual environment during the virtual game by the at least one of the virtual entities.

9. The method of claim 8 further comprising determining an order for the selected virutal packs based at least in part on prioritization information associated with each of the selected virtual packs and a predetermined group order.

10. The method of claim 8 further comprising:

selecting a plurality of virtual coaches based at least in part on weighted values associated each of the virtual coaches, wherein a virtual coach is selected for each of a plurality of coach slots within a coach pack, and generating instructions to display an interface displaying the selected virtual coaches.

11. The method of claim 8 further comprising generating instructions to display attributes and a position associated with each of the identified virtual profiles.

12. The method of claim 8 further comprising determining a virtual team for deployment within the game application based at least in part on virtual entities in the initial virtual team and at least one of the virtual entities selected during the virtual team draft.

13. The method of claim 8, wherein the virtual team includes a plurality of virtual entities associated with each position of the virtual team.

14. The method of claim 8, wherein the game application is further configured to:

identify an indication of interest with a first of the identified virtual profiles;

display attributes associated with the first identified virtual profile; and display at least a portion of the virtual team interface identifying other virtual entities associated with the at least one team position associated with the first identified virtual profile.

15. A non-transitory computer-readable medium storing computer-executable instructions that, when executed by one or more computing devices, configure the one or more computing devices to execute a game application, the game application configured to perform operations during runtime of the game application comprising:

generating a user interface within the game application comprising at least one interface element configured to receive input to initiate a virtual team draft;

receiving input to initiate a virtual team draft within the game application;

generating a virtual team comprising a plurality of virtual entities, the virtual team comprising a plurality of virtual team positions, each virtual entity associated with at least one virtual team position;

generating instructions to display a user interface configured to display a virtual team interface identifying the plurality of virtual entities within their associated virtual team positions during runtime of the game application;

selecting a predetermined number of virtual packs from one or more virtual predetermined virtual pack groups, based at least in part on a virtual draft framework, wherein the virtual draft framework comprises a plurality of draft rounds, wherein in each draft round a virtual pack is selected from a virtual pack group, each virtual pack group comprising a plurality of different virtual packs, each virtual pack comprising a plurality of a virtual pack slots, each virtual pack slot associated with a virtual profile group;

for each of the selected virtual packs, identifying a virtual profile for each virtual pack slot within the virtual pack from the associated virtual profile group, the identification of the virtual profile based, at least in part, on predetermined weighted values associated with the virtual profiles within the associated virtual profile group;

generating instructions to display each of the identified virtual profiles, each virtual profile associated with a drafted virtual entity being associated with at least one team position;

receiving input indicating a selection of one of the identified virtual profiles; and updating the user interface to display the drafted virtual entity associated with the selected virtual profile within the virtual team interface; and executing a virtual game using the virtual team within a virtual environment of the game application, wherein each virtual profile assigned to a virtual team position is represented by a virtual entity within the virtual environment when participating within the virtual game;

receiving user input from a first user to perform a first action within the virtual environment during the virtual game by at least one of the virtual entities on the virtual team; and in response to the user input, executing the first action within the virtual environment during the virtual game by the at least one of the virtual entities.

16. The computer readable medium of claim 15, wherein the game application is a football game and the virtual entities are virtual players on a football team.

17. The computer readable medium of claim 15, wherein the game application is further configured to perform operations comprising:

selecting a plurality of virtual coaches based at least in part on weighted values associated each of the virtual coaches, wherein a virtual coach is selected for each of a plurality of coach slots within a coach pack, and generating instructions to display an interface displaying the selected virtual coaches.

18. The computer readable medium of claim 15, wherein the game application is further configured to perform operations comprising generating instructions to display attributes and a position associated with each of the identified virtual profiles.

19. The computer readable medium of claim 15, wherein the game application is further configured to perform operations comprising determining a virtual team for deployment within the game application based at least in part on virtual entities in the initial virtual team at least one of the virtual entities selected during the virtual team draft.

20. The computer readable medium of claim 15, wherein the game application is further configured to perform operations comprising:

identifying an indication of interest with a first of the identified virtual profiles;

displaying attributes associated with the first identified virtual profile; and displaying at least a portion of the virtual team interface identifying other virtual entities associated with the at least one team position associated with the first identified virtual profile.

* * * * *

UNITED STATES PATENT AND TRADEMARK OFFICE
CERTIFICATE OF CORRECTION

PATENT NO.        : 10,449,460 B1
APPLICATION NO.   : 15/239640
DATED             : October 22, 2019
INVENTOR(S)       : Jeffrey Edward Frank et al.

Page 1 of 1

It is certified that error appears in the above-identified patent and that said Letters Patent is hereby corrected as shown below:

In the Claims

In Column 21, Line 9, Claim 9, delete "virutal" and insert --virtual--.

In Column 22, Line 54, Claim 19, delete "team at least" and insert --team and at least--.

Signed and Sealed this
First Day of December, 2020

Andrei Iancu
*Director of the United States Patent and Trademark Office*